United States Patent

[11] 3,568,820

[72] Inventor Richard D. Patch
 Castro Valley, Calif.
[21] Appl. No. 757,241
[22] Filed Sept. 4, 1968
[45] Patented Mar. 9, 1971
[73] Assignee Lucas-California Co.

[54] AIRSLEEVE TRANSFER SYSTEM
 3 Claims, 3 Drawing Figs.
[52] U.S. Cl. .................................................. 198/84
[51] Int. Cl. .................................................. B65g 37/00
[50] Field of Search........................................... 198/56, 57,
 20, 102; 198/84

[56] References Cited
UNITED STATES PATENTS
756,600 4/1904 Dodge.......................... 198/204
2,604,972 7/1952 Schmied........................ 198/84

Primary Examiner—Richard E. Aegerter
Attorney—Milmore & Cypher

ABSTRACT: A device consisting of an endless belt buoyed upwardly by air under pressure discharging from a plenum chamber having a plurality of discharge openings; the raised belt absorbes impact loads imparted by materials received from above the device and discharges them to a lower elevation.

AIRSLEEVE TRANSFER SYSTEM

BACKGROUND OF THE INVENTION

This invention arose out of the need to transfer packaged poultry without damage while in the process of being frozen from an upper conveyor belt to a lower conveyor belt. The poultry upon striking transfer chutes or ordinary transfer endless belts often punctured the hermetically sealed thin plastic package and resulted in freezer burns to the poultry thereby resulting in considerable loss to the food processors.

SUMMARY

The gist of the invention is the buoying up of the upper half of an endless belt with air pressure so that impact loads will be absorbed by a temporary lowering of the belt.

An object of the invention is to provide a transfer device which can cushion the fall of any material which is dropped from a higher elevation and is to be carried to a different location.

Another object is to provide a device which is relatively inexpensive to manufacture, capable of longlife and trouble free operation.

DESCRIPTION OF THE PREFERRED EMBODIMENTS

Figure 1:
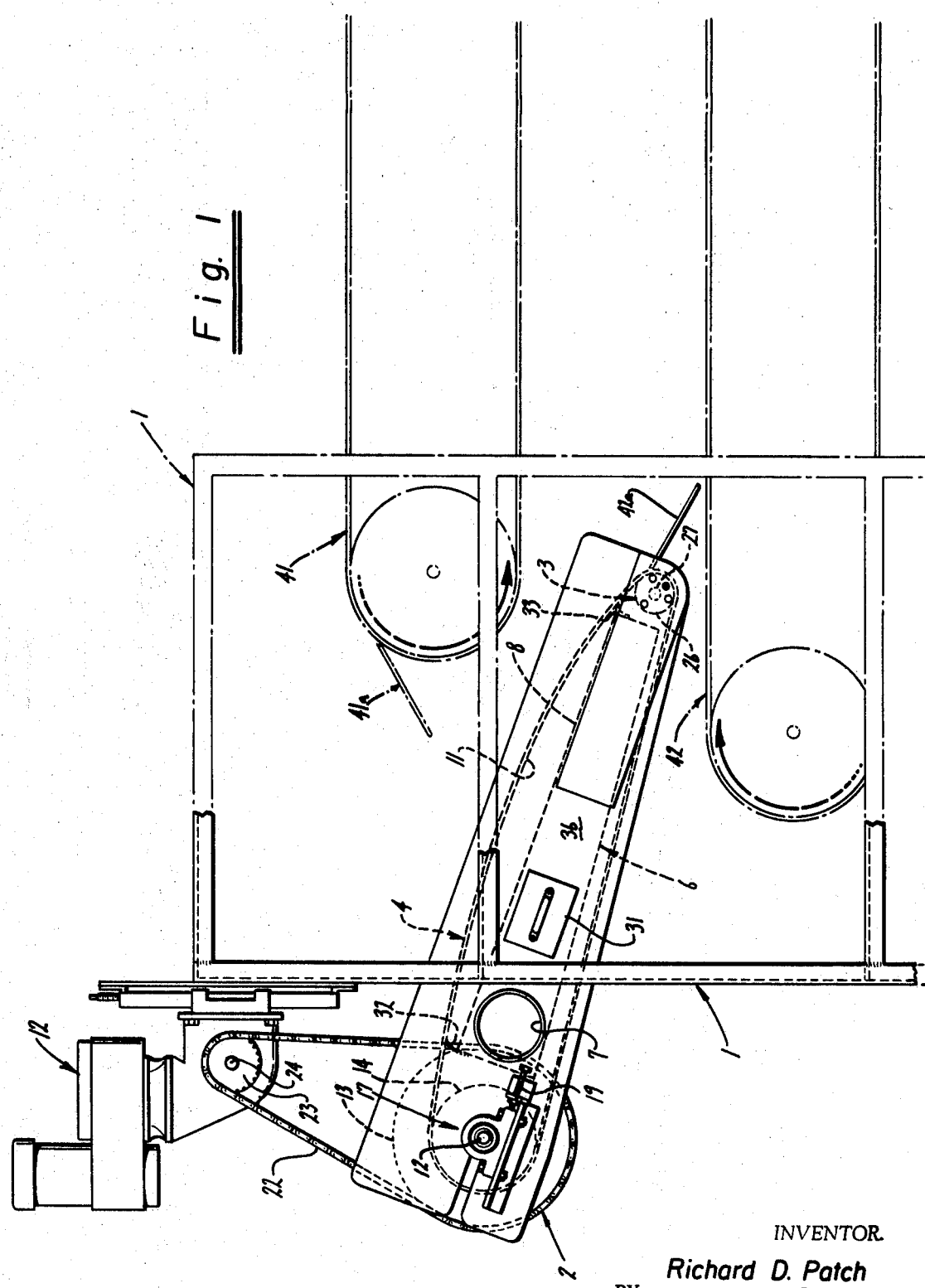
FIG. 1 is a side view of the device constructed in accordance with the present invention.
Figure 2:
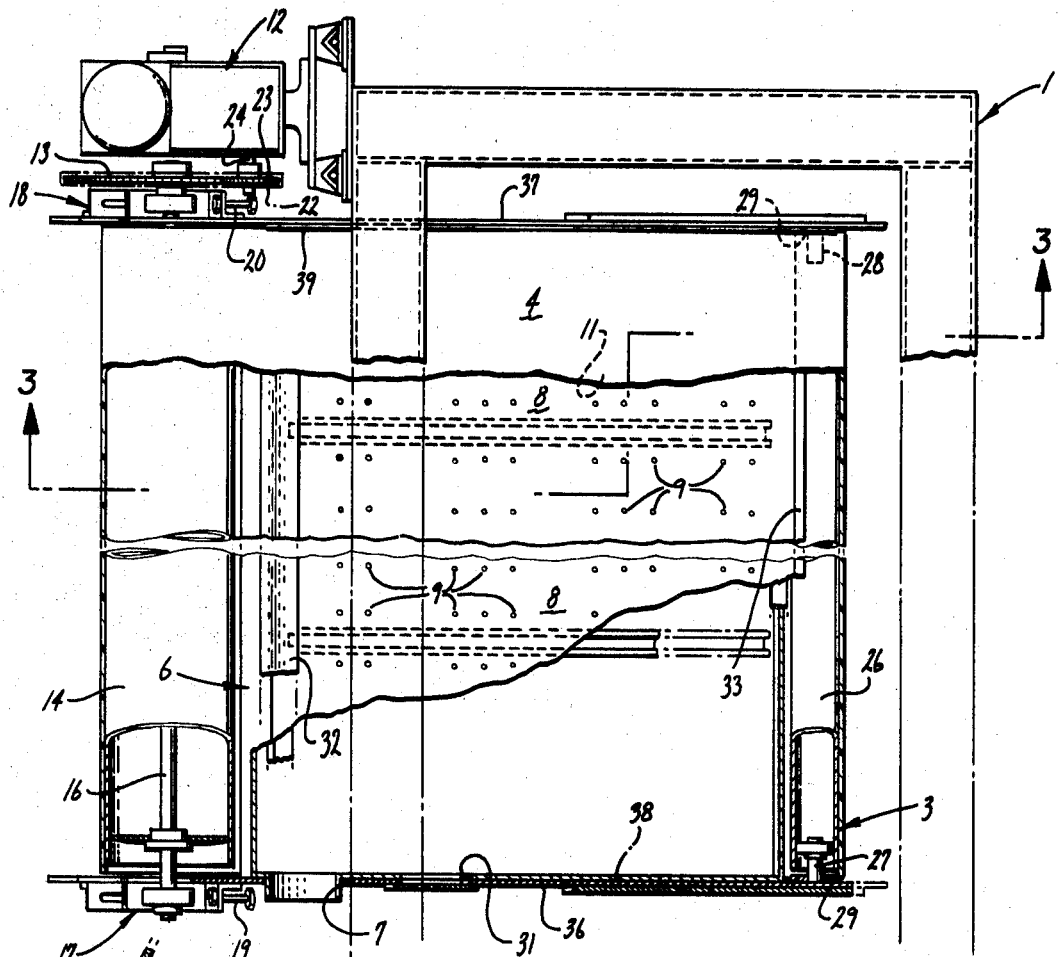
FIG. 2 is a plan view of a portion of the device with portions in cross section and portions removed for purposes of clarity.

The invention is an airsleeve transfer system which comprises briefly a frame 1; a belt driving assembly 2 mounted at one end of the frame; an idler assembly 3 mounted at the other end of the frame; a relatively impervious endless belt 4 mounted on and spanning the driving and idler assemblies; a plenum chamber 6 mounted on the frame between the assemblies having an air inlet port 7 and an upper pan member 8 having a plurality of laterally spaced air discharge openings 9 for directing air toward the underside 11 of the belt and raising the belt above its normal angle of repose to absorb impact loads directed against the upper side of the belt; means 12 driving the belt and means providing air pressure to the plenum chamber.

The belt driving assembly is conventional with a sprocket gear 13 connected for rotation with pulley roller 14 mounted for rotation on shaft 16. The shaft is journaled in end assemblies 17 and 18 connected to the frame. Jacking screws 19 and 20 provide longitudinal adjustment to take up the slack in the belt as desired. The sprocket is driven by a chain 22 which in turn is driven by sprocket 23 on shaft 24 connected to an electric variable motor.

The idler assembly is also conventional and here consists of an idler roll 26 connected to stub shafts 27 and 28 journaled for rotation in bearings 29.

The endless belt may be made of various materials so long as it remains flexible and relatively impervious to the passage of air or other gases. Preferably the belt is completely impervious to air but some slight passage of air could be tolerated. The material used in the belt is dependent upon the material to be transferred and the conditions under which it operates. It may be made of rubber or plastic or other materials. The length of the belt is slightly longer than would be the case in and ordinary endless belt installation because of the fact that it is desirable for the belt to pillow upwardly so that there is room for some "give" when the objects strike the belt from above. When the belts moves downwardly under the shock it absorbs the energy of the free falling object and prevents damage to the object being conveyed. Applicant specifically has found that the air buoyed belt is the solution to preventing damage to hermetically sealed packaged poultry which is riding twin sets of vertically spaced belts during a quick freezing process. The system may, however, be useful in cushioning the fall of any fragile object and then transporting it to a new location.

Figure 3:
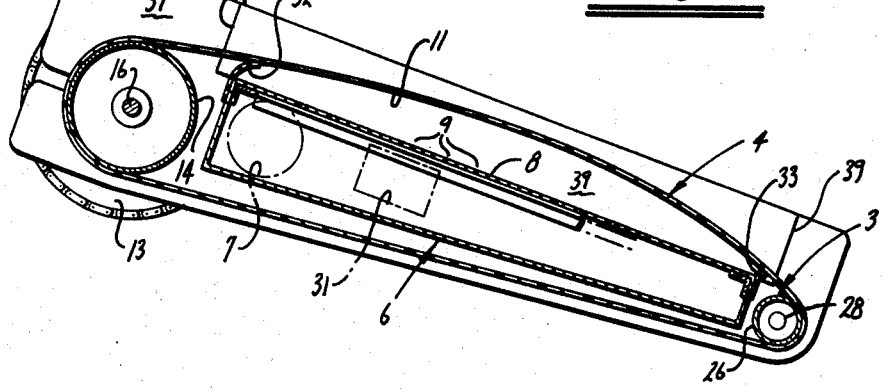
FIG. 3 is a cross-sectional view of a portion of the device taken substantially along the lines 3—3 of FIG. 2.

The apparatus which forces the belt into the shape shown in FIGS. 1 and 3 is a plenum chamber mounted on the frame between the roller assemblies. The chamber shown has 100 ½ -inch holes which are spaced about 6 inch apart transversely and are arranged in the longitudinal direction in clustered rows of two and three, 2 inch apart with the spacing between the clusters of rows at about 5 inch. In the arrangement shown, a 5 horsepower electric motor driving a blower provides about 3 p.s.i. of pressure within the plenum chamber which is adequate for this installation. Different pressures would be required depending upon the objects to be handled.

The air inlet port as shown in the drawings is 6 -inch diameter opening and the plenum chamber is preferably provided with a clean out opening 31 as well as suitable drain holes and plugs for removing any condensing vapor.

It has been found that the best belt characteristics are obtained by clustering the air discharge openings adjacent the longitudinal center of the plenum so that there are no discharge openings along the sides a distance equaling about one fourth of the width of the belt. This directing of the air against the longitudinal center of the belt decreases the inherent escape of air at the edges of the belt.

Another feature of the invention which provides the maximum flotation of the belt with the least expenditure of energy is the provision of guides 32 and 33 mounted at both ends of the plenum chamber enclosing the space between the underside of the raised belt and the ends of the pan member. The guides are curved in the direction of rotation of the belt and beside enclosing and directing the air pressure toward the underside of the belt they mechanically limit the drop of the belt to prevent contact of the belt with the pan should and unusually heavy surge of material fall on the belt.

Still another feature of the construction of the invention is the provision of a pair of side members 36 and 37 which extend the length of the belt and are of a height so as to completely enclose the side opening left by the fully extended belt. In addition to physically containing the products falling upon the belt, the guides also serve to trap and enclose the air cushion which is buoying up the belt. To prevent abrasion of the belt and to also assist the free flow of material along the guide, the inside surface of the guide should be coated such as with an adhesive backed Teflon 38 and 39.

Although the endless belt of the present invention may be used with any discharge system in which it is necessary to transfer fragile objects or objects in fragile packages after a free fall, the invention is especially designed for use with vertically spaced conveyor systems having endless belts 41 and 42. In the present invention, poultry rides perforated belts where it is subject to gas at low temperatures. In order to give the poultry time to freeze and keep the freezing tunnel to a compact size, the subject belt is interposed between the two conveyor belts.

In operation, air or gas is forced into the plenum chamber through the intake opening. The air flows through many small openings in the upper side of the plenum chamber and reacts against the underside of the upper half of the endless belt and forces it into the shape shown in FIGS. 3 and 1. An object dropping from upper belt extension strikes the belt 4 and causes it to deflect downwardly thus gently cushioning the fall of the object. The object is then moved by the endless belt to the lower belt extension 42a where it is transferred to conveyor 42. The upper extension 41a and the lower extension may be made of metal or other materials.

I claim:

1. An airsleeve transfer system comprising:
   a. a frame;
   b. a belt driving assembly mounted at one end of said frame;
   c. an idler assembly mounted at the other end of said frame;

d. a relatively impervious endless belt mounted on and spanning between said driving and idler assemblies; said belt having a length permitting substantial vertical movement to absorb impact energy;
e. a plenum chamber mounted on said frame between said assemblies having an air inlet port and an upper pan member having a plurality of laterally spaced air discharge openings for directing air toward the underside of said belt and raising said belt substantially above its normal angle of repose to absorb impact loads directed against the upper side of said belt;
f. means driving said belt;
g. a pair of guides mounted at both ends of said plenum chamber inwardly of said driving and idler assemblies enclosing the space between the underside of said raised belt and the ends of said pan member for directing the air pressure toward the underside of said belt and mechanically limiting the dropping of said belt to prevent contact of said belt with said pan;
h. means providing air pressure to said plenum chamber; and
i. a variable volume air chamber defined by said upper pan, said guides, the underside of said raised belt portion, and a pair of side members mounted at both sides of said plenum chamber extending above the belt and at right angles thereto and enclosing the space between the underside of said undulating raised belt portion and said upper pan and being spaced in close relation to the side edges of said belt to prevent material loss of air pressure, said variable volume air chamber decreasing in volume upon impact of objects striking said belt and increasing in pressure thereby absorbing energy as said belt lowers and said increase in pressure returns said belt to a raised position.

2. An airsleeve transfer system as described in claim 1 including: conveyor means mounted above the input side of said belt for discharging material thereon; and conveyor means mounted below the discharge end of said belt for receiving material therefrom.

3. An airsleeve transfer system as described in claim 2 wherein said input side of said belt is mounted at an elevation above the discharge end of said belts.